(12) United States Patent
Maruyama

(10) Patent No.: US 8,134,902 B2
(45) Date of Patent: Mar. 13, 2012

(54) OPTICAL DISC DRIVE APPARATUS AND ITS CONTROL METHOD

(75) Inventor: Hideki Maruyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 12/420,181

(22) Filed: Apr. 8, 2009

(65) Prior Publication Data

US 2009/0257330 A1    Oct. 15, 2009

(30) Foreign Application Priority Data

Apr. 11, 2008 (JP) ................................. 2008-103893

(51) Int. Cl.
*G11B 7/00* (2006.01)
*G01B 5/28* (2006.01)

(52) U.S. Cl. ..................... 369/69; 369/44.27; 369/53.18; 701/80

(58) Field of Classification Search ........................ None
See application file for complete search history.

(56) References Cited

U.S. PATENT DOCUMENTS

| 2,962,289 | A | * | 11/1960 | Greene ............................ 369/69 |
| 4,796,247 | A | * | 1/1989 | Vogelsang ................. 369/44.28 |
| 5,432,769 | A | * | 7/1995 | Honjo ........................... 386/326 |
| 5,436,875 | A | * | 7/1995 | Shinada ..................... 369/30.23 |
| 6,205,097 | B1 | * | 3/2001 | Dark et al. .................. 369/53.15 |
| 6,219,315 | B1 | * | 4/2001 | Buchs et al. ............... 369/44.11 |
| 6,292,440 | B1 | * | 9/2001 | Lee ................................... 369/7 |
| 6,335,910 | B1 | * | 1/2002 | Yoshizawa et al. ........ 369/53.18 |
| 6,484,089 | B1 | * | 11/2002 | Millington ..................... 701/208 |
| 7,444,224 | B2 | * | 10/2008 | Sadano et al. .................. 701/80 |
| 2001/0048642 | A1 | * | 12/2001 | Berhan ............................. 369/5 |
| 2003/0033071 | A1 | * | 2/2003 | Kawasaki ........................ 701/80 |
| 2004/0098187 | A1 | * | 5/2004 | Nakao .............................. 701/80 |

FOREIGN PATENT DOCUMENTS

| JP | 63-16400 | 1/1988 |
| JP | 05-334707 | 12/1993 |
| JP | 06-124168 | 5/1994 |
| JP | 06-302085 | 10/1994 |
| JP | 06-324138 | 11/1994 |
| JP | 08-263929 | 10/1996 |

(Continued)

OTHER PUBLICATIONS

Office Action in JP 2008-103893, mailed Dec. 20, 2011, (in Japanese, 2 pgs.).

*Primary Examiner* — Peter Vincent Agustin
(74) *Attorney, Agent, or Firm* — Antonelli, Terry, Stout & Kraus, LLP.

(57) ABSTRACT

An optical disc drive apparatus which is mounted on a mobile apparatus, which at least reads information from a disc surface of an optical disc disposed in a predetermined position by using a pickup, which is robust against vibration, and which is capable of preventing collision between the disc surface of the optical disc and the pickup. The apparatus judges a road surface condition associated with location information on the basis of the location information concerning a location on a road on which the mobile apparatus is traveling, acquired externally and road surface condition information depending upon a road surface condition of a road on which the mobile apparatus travels. Servo characteristics of the optical drive apparatus are controlled according to control information associated with the judged road surface condition.

7 Claims, 6 Drawing Sheets

FOREIGN PATENT DOCUMENTS

| | | |
|---|---|---|
| JP | 2003-077212 | 3/2003 |
| JP | 2004-046449 | 2/2004 |
| JP | 2005-100206 | 4/2005 |
| JP | 2005-203018 | 7/2005 |
| JP | 2006-040481 | 2/2006 |
| JP | 2006-284204 | 10/2006 |

* cited by examiner

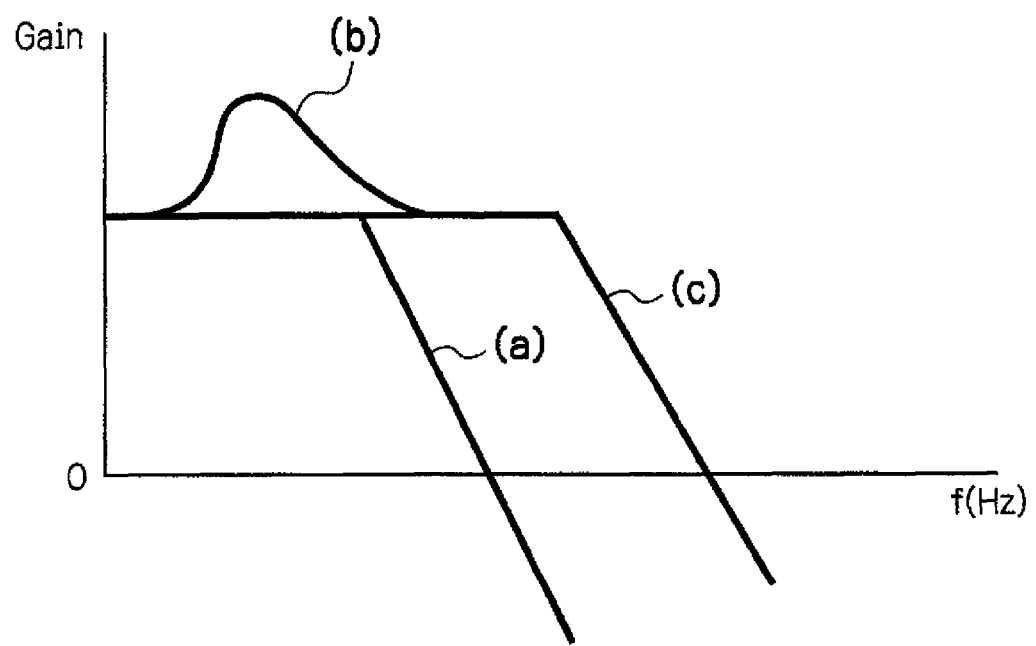

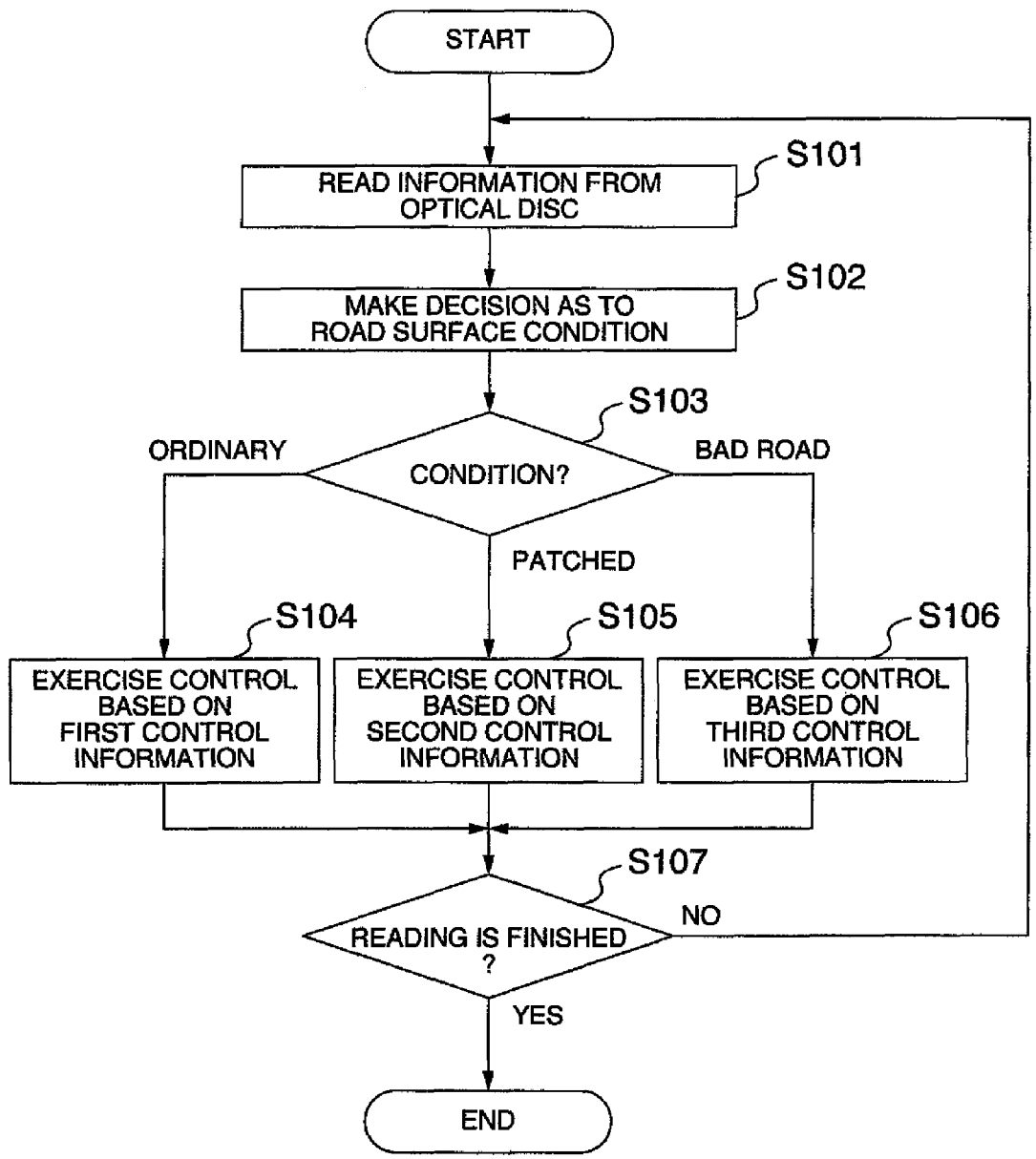

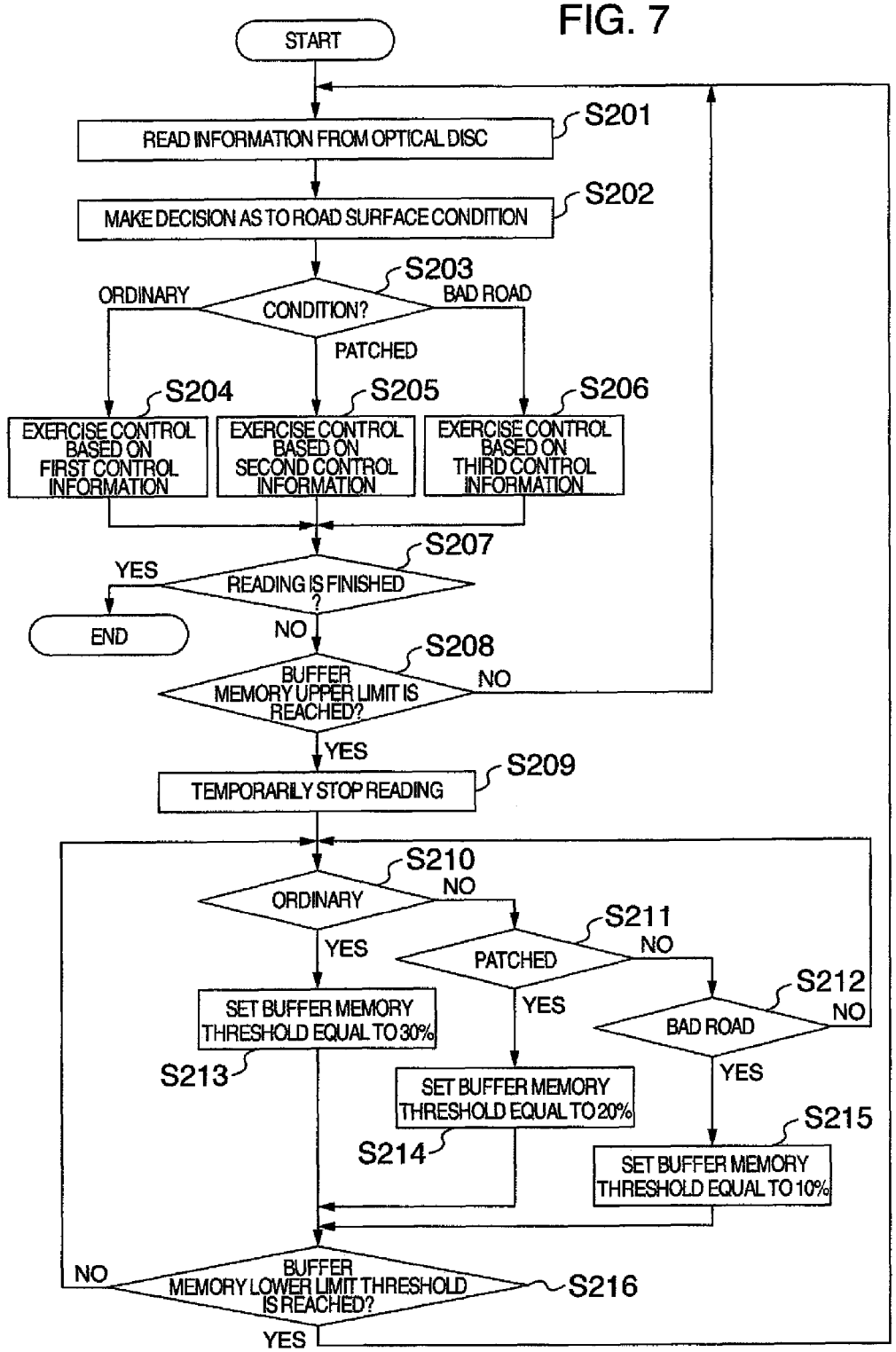

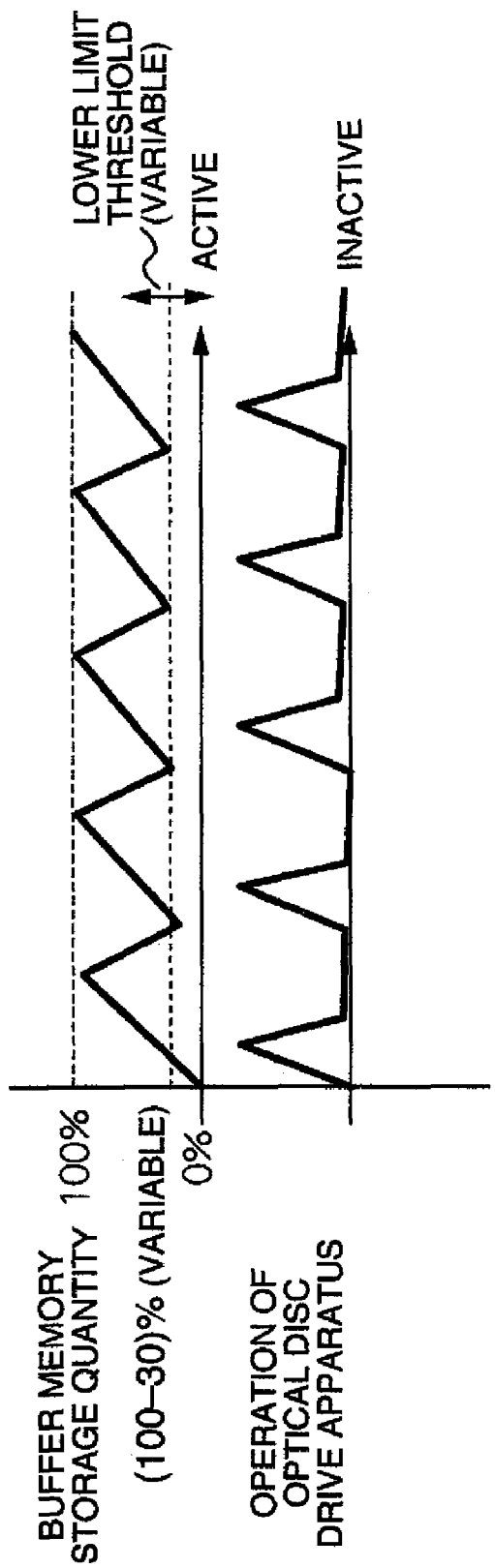

OPTICAL DISC DRIVE APPARATUS AND ITS CONTROL METHOD

INCORPORATION BY REFERENCE

The present application claims priority from Japanese application JP2008-103893 filed on Apr. 11, 2008, the content of which is hereby incorporated by reference into this application.

BACKGROUND OF THE INVENTION

The present invention relates to an optical disc drive apparatus and its control method. The present invention is suitable for application to, for example, an optical disc drive apparatus having a small working distance mounted on a mobile apparatus moved by a user, and its control method.

An optical disc drive apparatus for conducting reproduction or recording/reproduction on an optical disc is mounted, in some cases, on a vehicle-mounted apparatus or a portable information processing apparatus such as a notebook PC (Personal Computer), which is mounted on a vehicle.

The vehicle-mounted apparatus is used mainly when a vehicle is traveling. Furthermore, the notebook PC is also used by, for example, a user in a vehicle in some cases. In other words, the optical disc drive apparatus mounted on the above-described vehicle-mounted apparatus or notebook PC (hereafter, they are collectively referred to as mobile apparatus) reproduces information such as a road guide, music or video from an optical disc inserted according to a user's purpose when the user is traveling.

When reproducing information recorded on an optical disc, the optical disc drive apparatus emits light of a predetermined wavelength from an internal pickup to a disc surface of the optical disc, reads information by reading reflected light, and conducts reproduction on the basis of the information thus read.

By the way, a drive recorder which is a vehicle-mounted apparatus which retains information acquired from the outside when a trouble such as a system down has occurred and improves the efficiency of the elucidation of the trouble cause by referring to the retained information is known (see Patent Document 1).

Patent Document 1: JP-A-2004-46449

SUMMARY OF THE INVENTION

As for optical discs used in the above-described optical disc drive apparatus, CDs (Compact Discs) and DVDs (Digital Versatile Discs) are typical. In recent years, however, it has been studied to utilize BDs (Blue-ray Discs) which are optical discs in the next generation.

In an optical disc drive apparatus using a BD as a medium, however, the distance between a pickup and the disc surface of the BD, i.e., the so-called working distance is as very short as approximately 0.2 mm as compared with the CD and DVD. When the mobile apparatus is subjected to some impact during travel, therefore, there is a possibility that the tip of the pickup will come in contact with the disc surface of the BD. Especially when the BD is mounted on a vehicle which travels on a road frequently having jogs on its road surface or a road having patches on its road surface, the possibility that the pickup will come into contact with the disc surface of the BD in the optical disc drive apparatus because of the impact caused by jogs or patches on the road surface becomes high. If the contact has occurred, there is a possibility that a trouble such as scratching of the disc surface of the BD or damage of the pickup tip will be caused.

Power saving is also demanded of the optical disc drive apparatus mounted on a vehicle-mounted apparatus. This is because electronic apparatuses used in a vehicle increase in recent years and it is necessary to hold down the power use quantity of each electronic apparatus. Furthermore, power saving is demanded of the portable information processing apparatus in the same way because there is a limit in battery power.

The present invention has been made in view of these circumstances, and an object thereof is to provide an optical disc drive apparatus which is robust against vibration and which is capable of preventing collision between the disc surface of the optical disc and the pickup, and its control method.

Another object of the present invention is to provide an optical disc drive apparatus capable of saving power besides prevention of collision between the disc surface of the optical disc and the pickup.

In accordance with the present invention, an optical disc drive apparatus which is mounted on a mobile apparatus and which at least reads information from a disc surface of an optical disc disposed in a predetermined position by using a pickup includes road surface condition information storage unit for storing road surface condition information depending upon road surface conditions of a road on which the mobile apparatus travels, location information acquisition unit for acquiring location information concerning a location on the road on which the mobile apparatus is traveling, from external, control information storage unit for storing control information in association with the road surface condition, the control information being used to control reading of the information according to the road surface condition, and a control unit for judging a road surface condition associated with location information on the basis of the location information acquired by the location information and the road surface condition information stored by the road surface information storage unit, reading out control information associated with the judged road surface condition from the control information storage unit, and controlling servo characteristics of the optical drive apparatus according to the control information read out.

According to the present invention, an optical disc drive apparatus which is robust against vibration and which is capable of preventing collision between the disc surface of the optical disc and the pickup, and its control method can be provided.

In addition, according to the present invention, an optical disc drive apparatus capable of saving power besides prevention of collision between the disc surface of the optical disc and the pickup can be provided.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram for explaining first to third control information according to the first embodiment;

FIG. 6 is a flow chart showing processing according to the first embodiment;

FIG. 7 is a flow chart showing processing according to a second embodiment; and

FIG. 8 is a diagram showing a relation between a buffer memory storage quantity and an active/inactive state of an optical disc drive apparatus according to the second embodiment.

DETAILED DESCRIPTION OF THE EMBODIMENTS

Hereafter, embodiments of the present invention will be described with reference to the drawings. In the ensuing embodiments, the case where the present invention is applied to an optical disc drive apparatus mounted on a vehicle will be described.

First Embodiment

Figure 1:
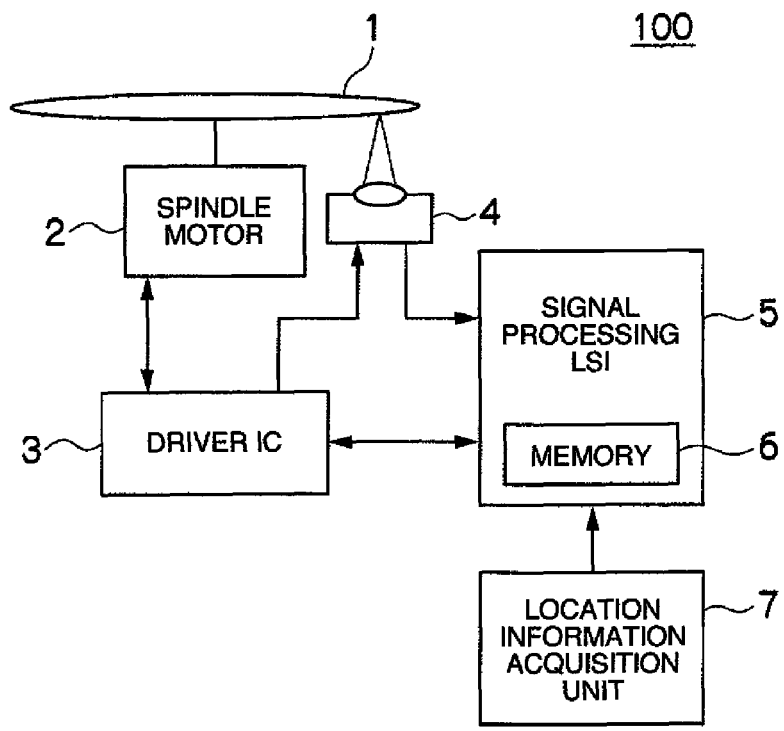
FIG. 1 is a diagram schematically showing a configuration of an optical disc drive apparatus according to a first embodiment of the present invention.

FIG. 1 is a block diagram showing a schematic configuration of an optical disc drive apparatus 100. As shown in FIG. 1, the optical disc drive apparatus 100 includes a spindle motor 2, a driver IC 3, a pickup 4, a signal processing LSI 5 having a memory 6, and a location information acquisition unit 7.

The spindle motor 2 is a motor for rotating an optical disc such as a BD disposed in a predetermined position. The pickup 4 emits light to a disc surface of an optical disc 1 rotated by the spindle motor, and detects its reflected light. The driver IC 3 controls the rotation of the spindle motor 2 and the light emission and the reflected light detection of the pickup 4. The signal processing LSI 5 processes a signal based upon the reflected light detected by the pickup 4 and controls drive of the driver IC 3.

The location information acquisition unit 7 acquires location information indicating the location of a vehicle on which the optical disc drive apparatus 100 is mounted. The location information is acquired by using, for example, the GPS (Global Positioning System), the VICS (Vehicle Information and Communication System) or the like. In the embodiments, it is supposed that the system for acquiring the location information is included in the location information acquisition unit 7. If the system is mounted on a different apparatus (for example, a car navigation system), however, the optical disk drive apparatus 100 may be configured so as to cause the signal processing LSI 5 to acquire the location information from the different apparatus.

Figure 2:
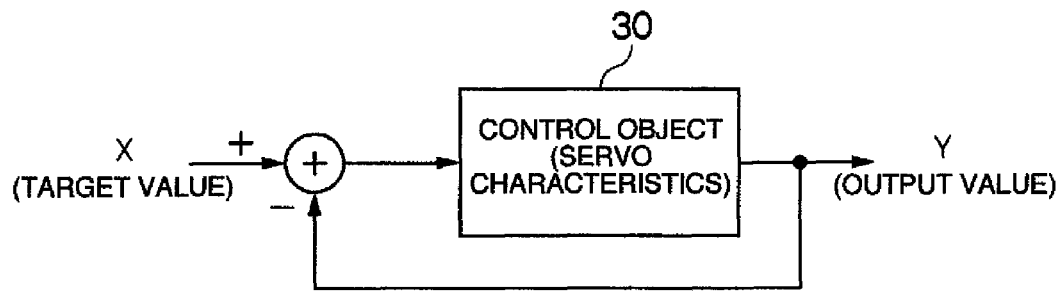
FIG. 2 is a diagram for explaining servo control according to the first embodiment.

FIG. 2 is a diagram for explaining typical servo control in the optical disc drive apparatus 100. In the servo control, control is exercised so as to cause a signal output from a target value X to become "0" before the signal arrives at a control object having predetermined servo characteristics. The working distance between the optical disc surface and the pickup is controlled by the servo control. In the case of the optical disc drive apparatus 100, the servo object is an actuator part in the pickup unit 4.

Figure 3:
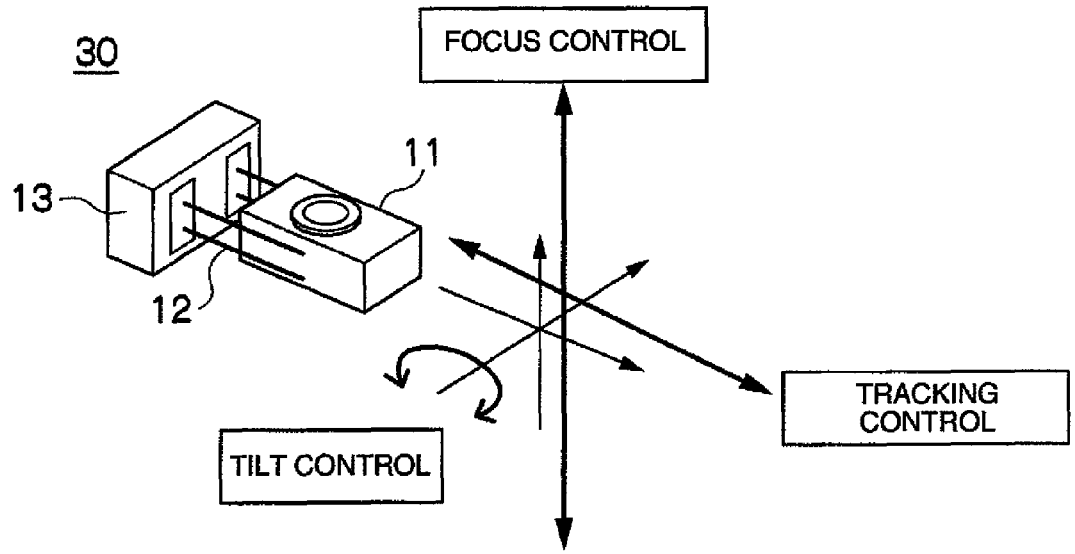
FIG. 3 is a diagram for explaining an object of the servo control according to the first embodiment.

FIG. 3 is a diagram for explaining control of an actuator part 30. The actuator part 30 includes an object lens 11, a spring part 12, and a permanent magnet and coil part 13. The object lens 11 is a lens which emits light from an optical disc and reads its reflected light. The spring part 12 moves the object lens 11. The permanent magnet and coil part 13 controls the movement of the object lens 11 conducted by the spring part 12. The servo control is executed specifically by conducting focus control, tracking control and tilt control. Since the focus control, tracking control and tilt control are the same as those in the conventional technique, description of them will be omitted.

The control of the actuator part 30 has been designed by taking the spring part 12, the permanent magnet and coil part 13, and power dissipation into consideration sufficiently. If an impact which disturbs the servo control, for example, an impact from a road surface on a vehicle on which the optical disc drive apparatus 100 is mounted has occurred, however, a trouble occurs in the servo control. In the embodiments, therefore, the optical disc drive apparatus 100 exercises servo control conforming to the condition of the road surface by using information stored in the memory 6.

Figure 4:
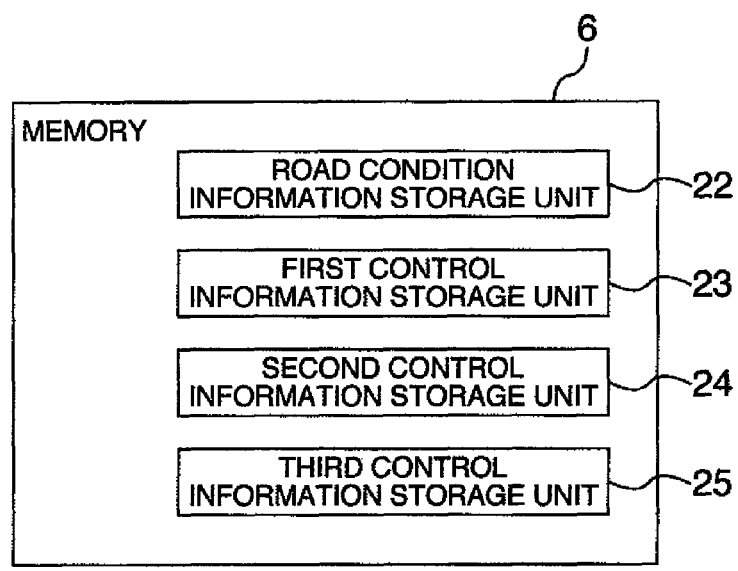
FIG. 4 is a diagram showing storage units formed in a memory according to the first embodiment.

FIG. 4 is a diagram for explaining information stored in the memory 6. The memory 6 includes a road condition information storage unit 22, a first control information storage unit 23, a second control information storage unit 24, and a third control information storage unit 25.

The road condition information storage unit 22 stores road surface condition information (hereafter referred to as road condition information as well) concerning the road surface condition associated with road information. As the road surface condition, there are three patterns: "ordinary", "patched" and "bad road". The "ordinary" condition is a condition under which the vehicle can travel on the road smoothly. The "patched" condition is a condition under which the road is patched at predetermined intervals and the vehicle receives an impact from the road surface at patch boundaries. The "bad road" condition is a condition under which jogs frequently occur on the road and the vehicle frequently receives impacts from the road surface.

In description of the embodiments, it is supposed that there are three patterns: "ordinary", "patched" and "bad road" for the road surface condition. Alternatively, the road surface condition may be defined in more detail. The road surface condition may be narrowed down to two patterns: "ordinary" and "bad road."

The road condition information is stored in the road condition information storage unit 22 when the optical disc drive apparatus 100 is shipped, and the road condition information is subject to version up at timing desired by the user. In an alternative configuration, for example, the road condition information is downloaded to the road condition information storage unit 22 via Internet and subject to version up as occasion demands. This configuration is effective to the case where the optical disc drive apparatus 100 is mounted on a portable information processing apparatus having an Internet connection function.

Control information for exercising the servo control is stored in each of the first control information storage unit 23, the second control information storage unit 24 and the third control information storage unit 25. First control information to be used by the signal processing LSI 5 to control the driver IC 3 when the road surface condition is "ordinary" is stored in the first control information storage unit 23. Second control information to be used by the signal processing LSI 5 to control the driver IC 3 when the road surface condition is "patched" (when subjected to periodic vibration) is stored in the second control information storage unit 24. Third control information to be used by the signal processing LSI 5 to control the driver IC 3 when the road surface condition is "bad road" (when subjected to sudden vibration) is stored in the third control information storage unit 25.

In this way, the optical disc drive apparatus 100 has a first mode in which the servo control is exercised by using the first control information, a second mode in which the servo control is exercised by using the second control information, and a third mode in which the servo control is exercised by using the third control information.

FIG. 5 is a diagram showing characteristics of the servo control in the first mode to the third mode. In FIG. 5, the ordinate axis indicates the gain, and the abscissa axis indicates f (Hz). Graphs (a) to (c) are shown in FIG. 5. The graph (a) indicates characteristics in the first mode ("ordinary"). The graph (b) indicates characteristics in the second mode ("patched"). The graph (c) indicates characteristics in the third mode ("bad road").

Processing executed in the signal processing LSI 5 will now be described. FIG. 6 is a flow chart showing processing executed in the signal processing LSI. This processing is started in response to, for example, an optical disc reproduction order given from the outside of the optical disc drive apparatus 100.

First, the signal processing LSI 5 controls the driver IC 3 and starts reading information from the optical disc 1 disposed in a predetermined position (S101).

Subsequently, the signal processing LSI makes a decision as to the road surface condition (S102). The decision as to the road surface condition is made on the basis of the location information which can be acquired from the location information acquisition unit 7 and the road condition information stored in the road condition storage unit 22. In other words, the road surface condition in the current location on the road specified by the location information is discriminated by using the road condition information.

And the signal processing LSI 5 makes a decision which of "ordinary", "patched", and "bad road" is the road surface condition in the current location (S103).

If the road surface condition is "ordinary", then the signal processing LSI 5 reads out the first control information stored in the first control information storage unit 23 and controls the driver IC 3 on the basis of the first control information (S104). As a result, the servo control is exercised in the first mode, and control on information readout from the optical disc 1 suitable for the case where the vehicle travels on the road smoothly is exercised.

If the road surface condition is "patched", then the signal processing LSI 5 reads out the second control information stored in the second control information storage unit 24 and controls the driver IC 3 on the basis of the second control information (S105). As a result, the servo control is exercised in the second mode, and control on information readout from the optical disc 1 suitable for the case where the vehicle travels on a road surface which gives impacts in patched places is exercised.

If the road surface condition is "bad road", then the signal processing LSI 5 reads out the third control information stored in the third control information storage unit 25 and controls the driver IC 3 on the basis of the third control information (S106). As a result, the servo control is exercised in the third mode, and control on information readout from the optical disc 1 suitable for the case where the vehicle travels on the road surface of the bad road.

And the signal processing LSI 5 makes a decision whether reading is finished (S107). If the reading is judged to be not finished (no at S107), then the signal processing LSI 5 returns to the processing in the step S101 and repeats the above-described processing. If the reading is judged to be finished (yes at S107), then the signal processing LSI 5 finishes the processing.

According to the first embodiment, the optical disc drive apparatus 100 mounted on a vehicle can make a decision as to which of "ordinary", "patched" or "bad road" is the road surface condition in a location on a road in which the vehicle is traveling, by using the location acquired from the outside and the road condition information stored in the road condition information storage unit 22, control the driver IC 3 in one of the first to third modes according to the road surface condition obtained by the decision, and read out information from the optical disc 1.

Therefore, even the optical disc drive apparatus 100 having a small working distance can read out information from the optical disc 1 according to the road surface condition, and prevent the disc surface of the optical disc 1 from colliding with the pickup 4.

Second Embodiment

As the second embodiment, the case where the present invention is applied to an optical disc drive apparatus 100 which conducts an intermittent reproduction operation will be described. Since the optical disc drive apparatus 100 has the same configuration as that described in the first embodiment, the same components are denoted by like reference numerals in the ensuing description and illustration and description of them will be omitted.

In the intermittent operation, the following operation is conducted. If information read out from the optical disc is stored in the memory by a predetermined quantity, then reading information from the optical disc is temporarily suspended and information reproduction is conducted by using information stored in the memory. If information stored in the memory reaches a definite quantity or less, then readout of information from the optical disc is conducted again until information of the predetermined quantity is stored in the memory. Since processing concerning reproduction of information stored in the memory is the same as that in the conventional technique, description thereof will be omitted.

Processing executed by the signal processing LSI 5 in the optical disc drive apparatus 100 which conducts the intermittent operation will now be described. FIG. 7 is a flow chart showing this processing. Since processing conducted in steps S201 to S207 is the same as that conducted in steps S101 to S107 in the first embodiment, description thereof will be omitted.

If the reading is judged to be not finished at the step S207 (NO at S207), then the signal processing LSI 5 makes a decision whether information stored in a buffer memory has reached an upper limit of the buffer memory (S208). Here, the buffer memory is a buffer memory for temporarily storing information read out from the optical disc 1 when conducting the intermittent operation. This buffer memory is provided in a predetermined region in the memory 6.

If the information stored in the buffer memory has not reached the upper limit of the buffer memory (NO at S208), then the signal processing LSI 5 returns to the processing returns to the processing in the step S201. On the other hand, if the information stored in the buffer memory has reached the upper limit of the buffer memory (YES at S208), then the signal processing LSI 5 temporarily stops the information reading from the optical disc 1 (S209).

And the signal processing LSI 5 makes a decision whether the road surface condition is "ordinary" (S210). Then the signal processing LSI 5 makes a decision whether the road surface condition is "patched" (S211). Then the signal processing LSI 5 makes a decision whether the road surface condition is "bad road" (S212). If the road surface condition is judged to be "ordinary" (YES at S210), then the signal processing LSI 5 sets a threshold of the buffer memory equal to 30% (S213). If the road surface condition is judged to be "patched" (YES at S211), then the signal processing LSI 5 sets the threshold of the buffer memory equal to 20% (S214). If the road surface condition is judged to be "bad road" (YES at S212), then the signal processing LSI 5 sets the threshold of the buffer memory equal to 10% (S215).

The threshold in the buffer memory is set in the processing at the steps S213 to S215. If the threshold of the buffer memory is, for example, 30%, then the threshold is reached when information stored in a memory region corresponding to 30% of the storage quantity of the buffer memory has been read out from the buffer memory. The threshold of the buffer memory is changed according to whether the road surface condition is "ordinary", "patched", or "bad road" by the processing in the steps S213 to S215. By the way, the threshold of the buffer memory is a value serving as a trigger for resuming information readout from the optical disc 1 in order to supplement the information stored in the buffer memory which is used for reproduction and reduced.

Subsequently, the signal processing LSI 5 makes a decision whether information stored in the memory region in the buffer memory has reached the buffer memory lower limit threshold (S216). By the way, the buffer memory lower limit threshold is equal to the threshold set in the steps S213 to S215. If the buffer memory lower limit threshold is not reached (NO at S216), then the processing returns to the processing in the step S210. As a result, the buffer memory lower limit threshold is set according to the road surface condition of the road while information readout from the optical disc 1 is temporarily stopped.

On the other hand, if the buffer memory lower limit threshold is reached (YES at S216), then the processing returns to the processing in the step S201. In other words, information reading from the optical disc 1 is resumed. If information stored in the buffer memory has reached the buffer memory lower limit threshold which is set, then information is read out from the optical disc 1 and the information stored in the buffer memory is supplemented by the information thus read out.

FIG. 8 is a diagram showing relations between the storage quantity of information stored in the buffer memory and operation of the optical disc drive apparatus 100. An upper side indicates a change of the buffer memory storage quantity. A lower side indicates whether the optical disc drive apparatus 100 is active or inactive.

As shown in FIG. 8, timing at which drive of the optical disc drive apparatus 100 is started changes according to the buffer memory lower limit threshold. In other words, when the buffer memory lower limit threshold (in FIG. 8, 30%) is reached, the optical disc drive apparatus 100 becomes active and reads information from the optical disc 1.

According to the second embodiment, it is possible to read information from the optical disc 1 according to the road surface condition of the road and supplement the information stored in the buffer memory by the information thus read out before the information stored in the buffer memory decreases to some extent, by changing the buffer memory lower limit threshold according to the road surface state of the road.

In this way, the buffer memory lower limit threshold is changed according to the road surface state. In the case where the road surface condition is "bad road", therefore, the information stored in the buffer memory is supplemented earlier than the case where the road surface condition is "ordinary" or "patched." Even if a situation where information cannot be read from the optical disc 1 because of impacts frequently occurring in the "bad road" condition occurs, therefore, information reproduction processing can be continued as long as possible and the situation where the reproduction processing stops can be prevented to the utmost. When the road surface condition is "ordinary," the buffer memory lower limit threshold is set equal to a value greater as compared with the case where the road surface condition is "patched" or "bad road." As a result, supplementation by the information read out from the optical disc 1 need not be conducted frequently, resulting in an increased power saving effect.

In the above-described embodiments, the case where the present invention is applied to the optical disc drive apparatus 100 which reads information from the optical disc 1 has been described. However, the present invention can also be applied to an optical disc drive apparatus which reads information from the optical disc 1 and writes information onto the optical disc 1.

In the above-described embodiments, the case where the optical disc drive apparatus is mounted on a vehicle has been described. However, the present invention can also be applied to a portable information processing apparatus such as, for example, a notebook PC having the optical disc drive apparatus mounted thereon.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc drive apparatus which is mounted on a mobile apparatus and which at least reads information from a disc surface of an optical disc disposed in a predetermined position by using a pickup, the optical disc drive apparatus comprising:
   a road surface condition information storage unit for storing road surface condition information depending upon road surface conditions of a road on which the mobile apparatus travels;
   a location information acquisition unit for acquiring externally obtained location information concerning a location on the road on which the mobile apparatus is traveling;
   a control information storage unit for storing control information in association with the road surface condition, the control information being used to control reading of the information according to the road surface condition; and
   a control unit for judging a road surface condition associated with location information on the basis of the location information acquired by the location information and the road surface condition information stored by the road surface information storage unit, reading out control information associated with the judged road surface condition from the control information storage unit, and controlling servo characteristics of the optical drive apparatus according to the control information read out,
   wherein:
   the control information in association with the road surface condition stored by the control information storage unit comprises first control information in an ordinary condition under which the mobile apparatus can travel smoothly, second control information in a patched condition under which the road surface is patched, and third control information in a bad road condition under which there are frequently jogs on the road surface, and the control unit reads out the first control information, the second control information, or the third control information according to the judged road surface condition.

2. The optical disc drive apparatus according to claim 1, wherein the road surface condition information stored by the road surface information storage unit is updated.

3. The optical disc drive apparatus according to claim 1, wherein the location information acquisition unit acquires the location information externally by using VICS (Vehicle Information and Communication System) or GPS (Global Positioning System).

4. The optical disc drive apparatus according to claim 1, wherein the mobile apparatus on which the optical disc drive apparatus is mounted is either a vehicle-mounted apparatus or a portable information processing apparatus.

5. The optical disc drive apparatus according to claim 1, wherein the control unit exercises intermittent control by stopping information reading from the optical disc when information read from an optical disc is stored in a buffer memory by a predetermined quantity, conducting information reproduction by using information stored in the buffer memory, and conducting information reading from the optical disc when information of a definite quantity from the buffer memory has been used for the reproduction.

6. The optical disc drive apparatus which is mounted on a mobile apparatus and which at least reads information from a disc surface of an optical disc disposed in a predetermined position by using a pickup, the optical disc drive apparatus comprising:

a road surface condition information storage unit for storing road surface condition information depending upon road surface conditions of a road on which the mobile apparatus travels;

a location information acquisition unit for acquiring externally obtained location information concerning a location on the road on which the mobile apparatus is traveling;

a control information storage unit for storing control information in association with the road surface condition, the control information being used to control reading of the information according to the road surface condition; and a control unit for judging a road surface condition associated with location information on the basis of the location information acquired by the location information and the road surface condition information stored by the road surface information storage unit, reading out control information associated with the judged road surface condition from the control information storage unit, and controlling servo characteristics of the optical drive apparatus according to the control information read out, wherein the control unit exercises intermittent control by stopping information reading from the optical disc when information read from an optical disc is stored in a buffer memory by a predetermined quantity, conducting information reproduction by using information stored in the buffer memory, and conducting information reading from the optical disc when information of a definite quantity from the buffer memory has been used for the reproduction, and wherein the control unit changes the definite quantity according to the road surface condition.

7. The optical disc drive apparatus according to claim 6, wherein the control unit decreases the definite quantity in the change as the road surface condition is aggravated.

\* \* \* \* \*